(12) United States Patent
Alenin

(10) Patent No.: US 7,190,598 B1
(45) Date of Patent: Mar. 13, 2007

(54) THREE-PHASE LOW NOISE CHARGE PUMP AND METHOD

(75) Inventor: Sergey Alenin, Tucson, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 4 days.

(21) Appl. No.: 11/219,026

(22) Filed: Sep. 2, 2005

(51) Int. Cl.
*H02M 7/25* (2006.01)
*G05F 1/10* (2006.01)

(52) U.S. Cl. .......................... 363/60; 327/536
(58) Field of Classification Search ............... 327/536; 363/59, 60
See application file for complete search history.

(56) References Cited

U.S. PATENT DOCUMENTS 6,294,948 B1 * 9/2001 Blodgett ................ 327/536

* cited by examiner

*Primary Examiner*—Shawn Riley
(74) *Attorney, Agent, or Firm*—W. James Brady, III; Frederick J. Telecky, Jr.

(57) ABSTRACT

A low noise charge pump circuit includes a first terminal of a first flying capacitor selectively coupled to a first voltage during a first recharging phase and a second terminal of the first flying capacitor selectively coupled to a second voltage during the first recharging phase. The second terminal of the first flying capacitor is coupled to a precharge control circuit during a first parasitic capacitance precharging phase that occurs after the first recharging phase to cause the voltage of the first terminal of the first flying capacitor to equal an output voltage. The first terminal of the first flying capacitor is coupled to an output conductor conducting the output voltage during a first discharging phase that occurs after the first parasitic capacitance precharging phase. The second terminal of the first flying capacitor is coupled to a discharge control circuit which increases the voltage of the second terminal of the first flying capacitor during the first discharging phase until the output voltage is equal to a regulated value.

20 Claims, 7 Drawing Sheets

FIG. 1A
(PRIOR ART)

INTERVAL 1

FIG. 1B
(PRIOR ART)

INTERVAL 2

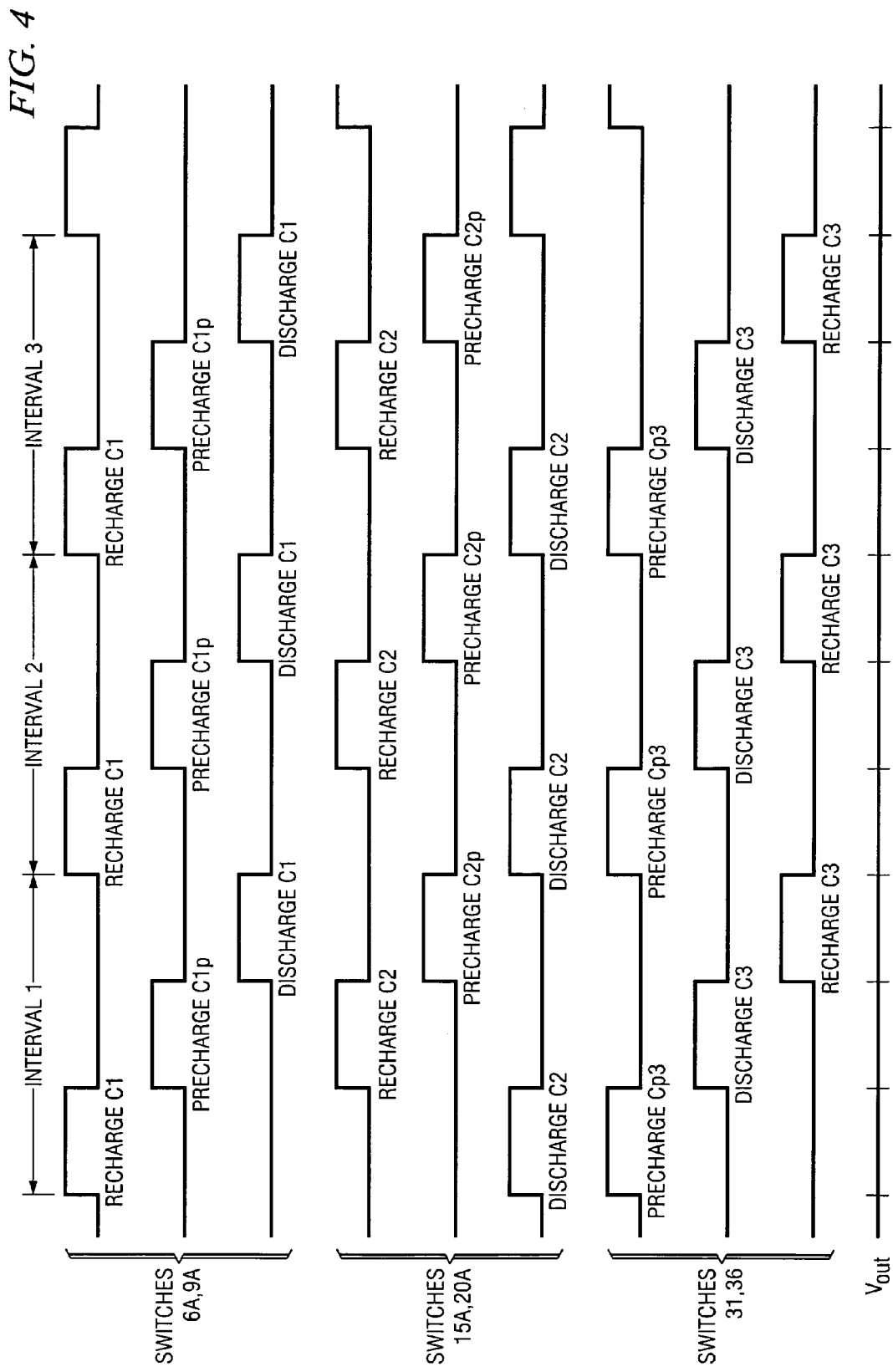

THREE-PHASE LOW NOISE CHARGE PUMP AND METHOD

BACKGROUND OF THE INVENTION

The present invention relates generally to charge pumps, and more particularly to an improvement which provides substantially reduced output noise compared to prior charge pumps.

On-chip generation of an internal supply voltage at a value greater than the power supply voltage rail VCC has been one approach to providing rail-to-rail operation of an operational amplifier. However, generation of such an internal supply by means of a charge pump circuit has been problematic due to the large amount of output noise (at the charge-pump clock frequency) produced by known charge pumps.

A standard charge pump circuit is a two-phase circuit including two "flying capacitors" and one "reservoir capacitor" which operate to store and maintain the output voltage of the charge pump circuit. FIG. 1A shows a standard charge pump circuit 1, which includes an amplifying circuit 2 having an output 3 connected to a control terminal of a controlled current source 4. Controlled current source 4 produces a current 10. The (−) input of amplifier 2 is connected to VCC. The (+) input of amplifier 2 is connected to the (−) terminal of a voltage source circuit 11, the (+) terminal of which is connected to a conductor 10 which conducts the output signal Vout produced by prior art charge pump 1. The upper terminal of controlled current source 4 is connected to VCC, and its lower terminal is connected to conductor 5. (It should be appreciated that amplifier 2 and controlled current source 4 can be implemented in various ways. For example, amplifier 2 can be implemented by means of a single P-channel transistor having its gate and source connected to the (−) input and (+input), respectively of amplifier 2, and its drain connected to the output 3 of amplifier 2. The implementation of amplifier 2 can be simple or moderately complex, depending on how accurate and/or fast it needs to be. Controlled current source 4 can be implemented by means of a single P-channel transistor having its source connected to VCC, its gate connected to the output 3, and its drain connected to conductor 5. Voltage source circuit 11 can be implemented by means of one or more diode-connected transistors and associated circuitry to achieve a desired voltage drop.)

Charge pump circuit 1 includes a first "flying" capacitor C1 having its upper plate connected by conductor 8 to one terminal of a switch 9 that controllably connects conductor 8 to either VCC or Vout conductor 10. The lower plate of capacitor C1 is connected by conductor 7 to one terminal of a switch 6 that controllably connects conductor 7 to either ground or conductor 5 of controlled current source 4. Charge pump circuit 1 also includes a second flying capacitor C2 having its upper plate connected by conductor 17 to one terminal of a switch 20 that controllably connects conductor 17 to either VCC or Vout conductor 10. The lower plate of capacitor C2 is connected by conductor 16 to one terminal of a switch 15 that controllably connects conductor 16 to either ground or conductor 5 of controlled current source 4. The lower plates of capacitors C1 and C2 are connected by conductors 7 and 16 to parasitic capacitors C1$p$ and C2$p$, respectively. A relatively large "reservoir" or "output" capacitor Cout is connected between Vout conductor 10 and VCC. A load 13 is connected between Vout conductor 10 and ground.

Each of the two flying capacitors has a recharge phase or "phase 1" (PH1) for charging a flying capacitor to VCC, and also has a subsequent discharge phase or "phase 2" (PH2) for discharging it through Vout conductor 10 into reservoir capacitor Cout or load 13. Discharge through controlled current source 4 is controlled to achieve regulation of Vout.

A drawback of prior art two-phase charge pump circuit 1 is that it has a fast, noise-producing transient process between its above mentioned first and second phases, during which the top plate of one of the flying capacitors is connected to reservoir capacitor Cout at the same time the voltage across the associated parasitic capacitor connected between the bottom plate of that flying capacitor and ground (i.e., the integrated circuit substrate) is still at 0 volts. This causes partial charge redistribution from the reservoir capacitor to the parasitic capacitor thereby producing negative voltage spikes on Vout conductor 10 which constitute a large amount of undesirable noise in the output voltage signal, as illustrated with respect to subsequently described FIG. 2.

Referring to FIG. 1A and the "Switches 6 & 9" and "Switches 15 & 20" waveforms of FIG. 2, switches 6 and 9 are closed during phase 1 of flying capacitor C1 to charge it up to VCC, and alternately, preferably with a 50% duty cycle, switches 15 and 20 are closed to charge C2 up to VCC in such a manner as to effectively maintain Vout at its desired voltage level while supplying whatever current is needed by reservoir capacitor Cout and load 13. The value of the desired regulated voltage level is established by the voltage drop across voltage source circuit 11. Thus, half of the time each flying capacitor is being recharged by being connected between VCC and ground while the other flying capacitor is being controllably discharged into Vout conductor 10 to supply to reservoir capacitor Cout and load 13 whatever amount of current is needed maintain a regulated Vout at its desired voltage. The roles of the two flying capacitors are reversed the other half of the time. A switch control circuit 18 is coupled to control terminals of switches 6, 9, 15 and 20 to control their operation as described herein.

The configurations of switches 6, 9, 15 and 20 are illustrated in FIGS. 1A and 1B for the first half ("Interval 1") and the second half ("Interval of 2"), respectively, of each cycle of operation of charge pump 1. Specifically, in FIG. 1A, capacitor C1 is in its phase 1 (PH1), with upper switch 9 connected to VCC and switch 6 connected to ground to recharge capacitor C1, and at the same time capacitor C2 is in its phase 2 (PH2), with upper switch 20 connected to Vout and lower switch 15 connected to current source conductor 5 to cause capacitor C2 to be discharged into Vout conductor 10. Similarly, in FIG. 1B capacitor C2 is in its phase 1 (PH1), with upper switch 20 connected to VCC and switch 15 connected to ground to ground to recharge capacitor C2, and at the same time capacitor C1 is in its phase 2 (PH2), with upper switch 9 connected to Vout and lower switch 6 connected to current source conductor 5 to cause capacitor C1 to be discharged into Vout conductor 10.

Thus, as C1 is being recharged while it is connected between VCC and ground, capacitor C2, which has just been charged up to VCC volts, is being discharged into Vout conductor 10 by being connected between the output of controlled current source 4 and Vout conductor 10. At the instant when capacitor C2 is connected between output conductor 10 and conductor 5, the connection to Vout causes the voltage of top plate conductor 17 of capacitor C2 to equal Vout, and the full charge voltage VCC across capacitor C2 causes the voltage of bottom plate conductor 16 to equal Vout−VCC. Then controlled current source 4 begins supplying current 10 through conductor 5 to bottom plate conductor 16, charging up parasitic capacitor C2p and increasing the voltage of bottom plate conductor 16. This also increases the voltage of top plate conductor 17 of capacitor C2 and causes capacitor C2 to discharge through top plate conductor 17 into output conductor 10. Thus, the top plate conductor 17 goes to Vout and the bottom plate conductor 16 goes to Vout−VCC volts. As the current 10 continues to be supplied to bottom plate conductor 16 and increase its voltage, top plate conductor 17 remains at Vout, causing capacitor Cout to discharge a current equal to 10 into output conductor 10. More specifically, amplifier 2 together with controlled current source 4 form a feedback loop which keeps Vout constant (as much as the loop gain allows) and the amount of current 10 is determined by the load current required by load 13 and reservoir capacitor Cout plus some energy loss in the parasitic capacitive dividers.

Amplifier 2 continues to control current source 4 in response to Vout so as to properly regulate Vout, and at the same time, switch control circuit 18 operates according to a suitable 50% duty cycle such that just before the voltage on bottom plate conductor 16 reaches VCC or just before controlled current source 4 saturates, switch control circuit 18 reverses the roles of flying capacitors C1 and C2 so a freshly recharged flying capacitor is available to supply the needed current to output conductor 10. FIG. 1B shows the configuration of switches 9A and 6A and switches 20A and 15A during Interval 2 immediately after the roles of capacitors C1 and C2 have been reversed.

The connection of either one of the flying capacitors, for example capacitor C1, between Vout and conductor 5 causes the above-mentioned noise on Vout conductor 10. At the instant when capacitor C1 is connected between output conductor 10 and controlled current source conductor 5, a capacitive divider circuit is formed which includes parasitic capacitor C1p parasitic and reservoir capacitor Cout. Therefore, some of the charge of reservoir capacitor Cout is redistributed to parasitic capacitance C1p, in accordance with the ratio between them and parasitic capacitance C1p "discharges" or partially discharges reservoir capacitor Cout. This causes a fast negative-going spike in Vout, which constitutes the noise above mentioned noise. Current source 4 then operates to increase Vout from the bottom of that negative-going spike back up to its proper regulated level.

Such negative-going noise spikes occur every time the roles of flying capacitors C1 and C2 are reversed, i.e., the noise occurs at the clock frequency of charge pump 1, as shown in the Vout waveform of FIG. 2. The approximate typical amplitude of the negative noise spikes can be calculated from Vout−Vcc (which can be about 1.5–2.0 volts) and the ratio between reservoir capacitor Cout and the parasitic capacitance C1p or C2p. The reservoir capacitance Cout may be 3 to 5 times the capacitance of the flying capacitors, and the capacitance of a flying capacitor can be roughly 4 to 10 times the associated parasitic capacitance. This can typically result in negative noise spikes of roughly 70 millivolts.

Thus, there is an unmet need for an improved charge pump circuit having substantially reduced output noise.

SUMMARY OF THE INVENTION

It is an object of the invention to provide an improved charge pump circuit having substantially reduced output noise.

It is another object of the invention to provide an improved charge pump without having to provide a large reservoir capacitor connected to the charge pump output conductor.

Briefly described, and in accordance with one embodiment, the present invention provides a low noise charge pump circuit that includes a first terminal (8) of a first flying capacitor (C1) selectively coupled to a first voltage (VCC) during a first recharging phase and a second terminal (7) of the first flying capacitor (C1) selectively coupled to a second voltage (GND) during the first recharging phase. The second terminal (7) of the first flying capacitor (C1) is coupled to a precharge control circuit (25,27) during a first parasitic capacitance precharging phase that occurs after the first recharging phase to cause the voltage of the first terminal (8) of the first flying capacitor (C1) to have a value that avoids noise lights on the output conductor due to charge redistribution when the first terminal (8) of the first flying capacitor (C1) is coupled to the output conductor (10). The first terminal (8) of the first flying capacitor (C1) is coupled to an output conductor (10) conducting the output voltage (Vout) during a first discharging phase that occurs after the first parasitic capacitance precharging phase. The second terminal (7) of the first flying capacitor (C1) is coupled to a discharge control circuit (2,4) which increases the voltage of the second terminal (7) of the first flying capacitor (C1) during the first discharging phase until the output voltage (Vout) is equal to a regulated value.

In a described embodiment, a three-phase charge pump circuit for producing a low noise output voltage (Vout) on an output conductor (10) includes a first flying capacitor (C1), a first amplifier circuit (2) having an output (3) coupled to control a first current source (4) to produce a first controlled current (10) in a first conductor (5) in response to the output voltage (Vout), a first input coupled to a first supply voltage (VCC), and a second input coupled to the output conductor (10). A second amplifier circuit (25) has an output (26) coupled to control a second current source (27) to produce a second controlled current (13) in a second conductor (30) in response to a precharge voltage (Vprecharge), a first input coupled to the first supply voltage (VCC), and a second input coupled to receive the precharge voltage (Vprecharge). A first switching circuit (9A) selectively couples a first terminal (8) of the first flying capacitor (C1) to the first supply voltage (VCC) during a first recharging phase and to the output voltage (Vout) during a first discharging phase. A second switching circuit (6A) selectively couples a second terminal (7) of the first flying capacitor (C1) to a second supply voltage (GND) during the first recharging phase and to the first conductor (5) during the first discharging phase. The second switching circuit (6A) couples the second terminal (7) of the first flying capacitor (C1) to the second conductor (30) during a first parasitic capacitance precharging phase that occurs between the first recharging phase and the first discharging phase so as to cause the voltage of the first terminal (8) of the first flying capacitor (C1) to have a value that avoids noise spikes on the output conductor (10) due to charge redistribution when the first terminal (8) of the first flying capacitor (C1) is coupled to the output conductor (10). The three-phase charge pump circuit of claim 1 may include a reservoir capacitor (Cout) coupled to the output conductor (10).

In the described embodiments, the three-phase charge pump circuit includes a second flying capacitor (C2), a third switching circuit (20A) for selectively coupling a first terminal (17) of the second flying capacitor (C2) to the first supply voltage (VCC) during a second recharging phase and to the output voltage (Vout) during a second discharging phase, a fourth switching circuit (15A) for selectively coupling a second terminal (16) of the second flying capacitor (C2) to the second supply voltage (GND) during the second recharging phase and to the first conductor (5) during the second discharging phase. A fourth switching circuit (20A) couples the second terminal (16) of the second flying capacitor (C2) to the second conductor (30) during a second parasitic capacitance precharging phase that occurs between the second recharging phase and the second discharging phase so as to cause the voltage of the first terminal (17) of the second flying capacitor (C2) to have a value that avoids noise spikes on the output conductor (10) due to charge redistribution when the first terminal (17) of the second flying capacitor (C2) is coupled to the output conductor (10). The three-phase charge pump also includes a third flying capacitor (C3), a fifth switching circuit (36) for selectively coupling a first terminal (34) of the third flying capacitor (C3) to the first supply voltage (VCC) during the third recharging phase and to the output voltage (Vout) during a third discharging phase, a sixth switching circuit (31) for selectively coupling a second terminal (33) of the third flying capacitor (C3) to the second supply voltage (GND) during the third recharging phase and to the first conductor (5) during the third discharging phase. The sixth switching circuit (31) couples the second terminal (33) of the third flying capacitor (C3) to the second conductor (30) during a third parasitic capacitance precharging phase that occurs between the third recharging phase and the third discharging phase so as to cause the voltage of the first terminal (34) of the third flying capacitor (C3) to have a value that avoids noise spikes on the output conductor (10) due to charge redistribution when the first terminal (34) of the third flying capacitor (C3) is coupled to the output conductor (10).

In one described embodiment, the first switching circuit (9A) couples the first terminal (8) of the first flying capacitor (C1) to a third conductor (40) conducting the precharge voltage (Vprecharge) during the first parasitic capacitance precharging phase. In another described embodiment, the first switching circuit (9A) couples the first terminal (8) of the first flying capacitor (C1) to an electrically floating conductor (40 of FIG. 6) during the first parasitic capacitance precharging phase. The first amplifying circuit (2) includes a voltage source circuit (11) which determines a regulated value of the output voltage (Vout).

In the described embodiments, a first terminal (17) of a second flying capacitor (C2) is coupled to the output conductor (10) during a second discharging phase and a second terminal (16) of the second flying capacitor (C2) coupled to the discharge control circuit (2,4) to increase the voltage of the second terminal (17) of the second flying capacitor (C2) during the second discharging phase until the output voltage (Vout) is equal to the regulated value. A second terminal (33) of a third flying capacitor (C3) is coupled to a precharge control circuit (25,27) during a third parasitic capacitance precharging phase to cause the voltage of the first terminal (34) of the third flying capacitor (C3) to have a value that avoids noise spikes on the output conductor (10) due to charge redistribution when the first terminal (34) of the third flying capacitor (C3) is coupled to the output conductor (10). The first terminal (17) of the second flying capacitor (C2) is coupled to the first voltage (VCC) during a second recharging phase and the second terminal (16) of the second flying capacitor (C2) is selectively coupled to the second voltage (GND) during the second recharging phase. The first terminal (34) of the third flying capacitor (C3) is coupled to the output conductor (10) during the third discharging phase and the second terminal (33) of the third flying capacitor (C3) is coupled to the discharge control circuit (2,4) to increase the voltage of the second terminal (34) of the third flying capacitor (C3) during the third discharging phase until the output voltage (Vout) is equal to the regulated value. The second terminal (16) of the second flying capacitor (C2) is coupled to the precharge control circuit (25,27) during a second parasitic capacitance precharging phase to cause the voltage of the first terminal (17) of the second flying capacitor (C2) to have a value that avoids noise spikes on the output conductor (10) due to charge redistribution when the first terminal (17) of the second flying capacitor (C2) is coupled to the output conductor (10). The first terminal (34) of a third flying capacitor (C3) is selectively coupled to the first voltage (VCC) during a third recharging phase and the second terminal (33) of the third flying capacitor (C3) is coupled to the second voltage (GND) during the third recharging phase.

BRIEF DESCRIPTION OF THE DRAWINGS

FIG. 1A is a schematic diagram of a prior art charge pump with its switches in a first configuration.

FIG. 1B is a diagram of the charge pump of FIG. 1A with its switches in a second configuration.

FIG. 4 is a diagram including several waveforms useful in explaining the operation of the charge pump of FIG. 3A so as to greatly reduce the amount of noise generated on Vout conductor 10.

DETAILED DESCRIPTION OF THE PREFERRED EMBODIMENTS

The method and structure of the present invention are utilized to provide a very low noise charge pump circuit. This is accomplished by providing a three-phase charge pump circuit 100 shown in FIG. 3A having three flying capacitors, each having three phases of operation. An additional "phase 3" (PH3) of operation of each flying capacitor and associated circuitry occurs between the previously described "phase 1" (PH1) and "phase 2" (PH2)operations of previously described prior art charge pump 1 of FIG. 1A.

Figure 3A:
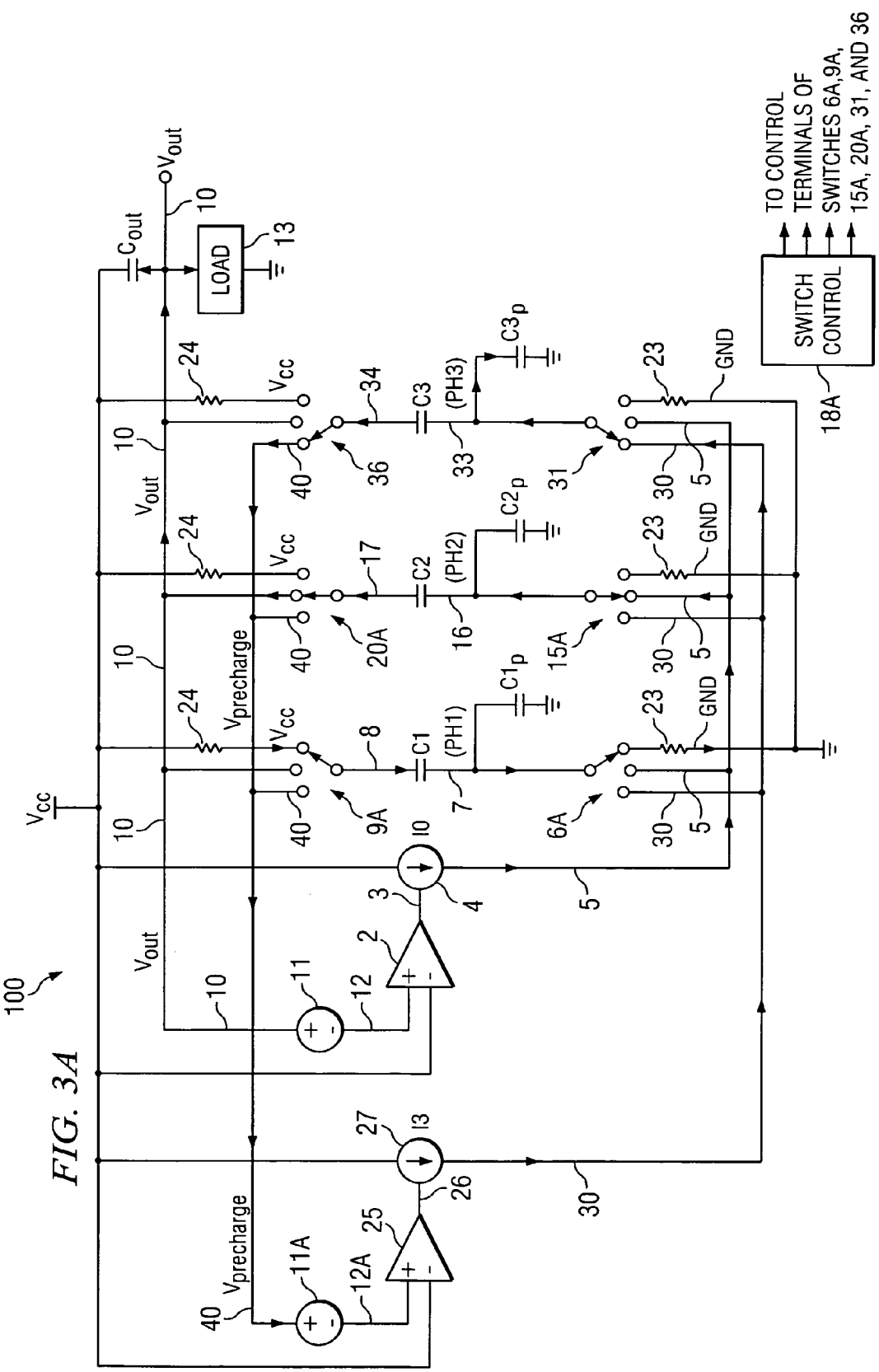
FIG. 3A is a schematic diagram of a charge pump of the present invention with a feed forward implementation of its precharging circuitry, with its switches in a first configuration.

FIG. 3A shows a charge pump circuit 100, which includes an amplifying circuit 2 having an output 3 connected to a control terminal of a controlled current source 4. Controlled current source 4 produces a controlled current 10, wherein the amount of controlled current 10 is determined by load demand of reservoir capacitor Cout and load 13 and also by the feedback loop being controlled through operation of amplifier 2. The (−) input of amplifier 2 is connected to VCC. The (+) input of amplifier 2 is connected to the (−) terminal of a voltage source circuit 11, the (+) terminal of which is connected to a conductor 10 which conducts the output signal Vout produced by charge pump 100. The upper terminal of controlled current source 4 is connected to VCC, and its lower terminal is connected to conductor 5. Amplifier 2 and controlled current source 4 can be implemented in various ways, from simple to moderately complex, depending on how accurate and/or fast amplifier 2 needs to be. A simple implementation is shown in FIG. 7.

Charge pump circuit 100 also includes an additional amplifying circuit 25 having an output 26 connected to a control terminal of a controlled current source 27. Controlled current source 27 produces a current I3. The (−) input of amplifier 25 is connected to VCC. The (+) input of amplifier 25 is connected to the (−) terminal of a voltage source circuit 11A, the (+) terminal of which is connected to a conductor 40 which conducts the precharge signal Vprecharge.

Charge pump circuit 100 includes a first flying capacitor C1 having its upper plate connected by conductor 8 to one terminal of a switch 9A that selectively connects conductor 8 to one of VCC, Vout conductor 10, or Vprecharge conductor 40. The lower plate of flying capacitor C1 is connected by conductor 7 to one terminal of a switch 6A that selectively connects conductor 7 to one of ground, conductor 5 of controlled current source 4, or conductor 30 of controlled current source 27.

Charge pump circuit 100 also includes a second flying capacitor C2 having its upper plate connected by conductor 17 to one terminal of a switch 20A that selectively connects conductor 17 to one of VCC, Vout conductor 10, or Vprecharge conductor 40. The lower plate of flying capacitor C2 is connected by conductor 16A to one terminal of a switch 15 that controllably connects conductor 16 to one of ground, conductor 5 of controlled current source 4, or conductor 30 of controlled current source 27.

Charge pump circuit 100 also includes a third flying capacitor C3 having its upper plate connected by conductor 34 to one terminal of a switch 36 that controllably connects conductor 34 to one of VCC, Vout conductor 10, or Vprecharge conductor 40. The lower plate of flying capacitor C3 is connected by conductor 33 to one terminal of a switch 31 that controllably connects conductor 33 to one of ground, conductor 5 of controlled current source 4, or conductor 30 of controlled current source 27.

It should be appreciated that during the recharge phases PH1, when the upper plate and lower plate of the flying capacitor are coupled to VCC and ground, respectively, by the upper switches and lower switches, noise injection into the VCC and ground power supply rails can be reduced or minimized by providing current limiting devices between the VCC rail and the upper switch (e.g., switch 9A) and/or between the GND rail and the lower switch (e.g., switch 6A), because the power supply impedance is never as low as zero. FIG. 3A illustrates such current limiting devices 24 connected between the VCC supply rail and the VCC terminal of each of upper switches 9A, 20A, and 36, and also illustrates current limiting devices 23 connected between the GND supply rail and the GND terminal of each of lower switches 6A, 15A, and 31. The current limiting devices 23 and 24 can be low value resistors or controlled current sources.

The lower plates of flying capacitors C1, C2, and C3 are connected by conductors 7, 16 and 33 to parasitic capacitors C1p, C2p, and C3p, respectively. A relatively large reservoir capacitor Cout can be connected between Vout conductor 10 and VCC. A load 13 is connected between Vout conductor 10 and ground.

It should be understood that in some cases 3-phase charge pump 100 can operate without a large reservoir capacitance Cout, because of the much smoother, noise-free nature of the output signal Vout being produced on conductor 10.

Each of the three flying capacitors C1, C2, and a C3 has a charging "phase 1" (PH1) for charging that particular flying capacitor to VCC, followed by a precharging "phase 3" (PH3) and a subsequent discharge "phase 2" (PH2) for discharging it through Vout conductor 10 into reservoir capacitor Cout and load 13. During the precharging phase 3, the bottom plate parasitic capacitor of the particular flying capacitor which has just been recharged up to VCC volts then is pre-charged so that the voltage on its top plate is equal to Vout immediately before it is directly connected to Vout.

Figures 1A, 1B:
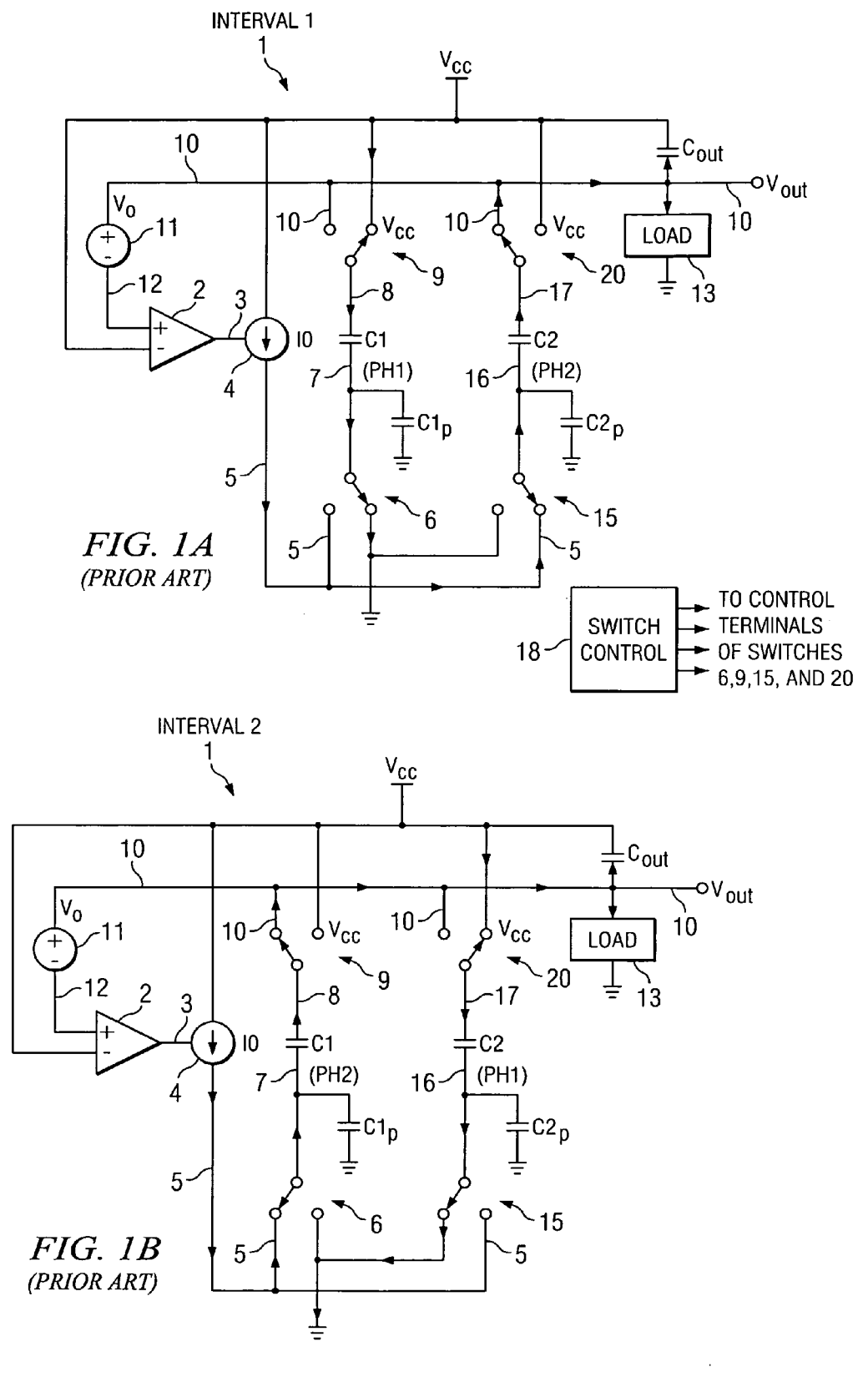

This substantially eliminates the previously mentioned charge redistribution and the resulting negative-going noise spikes which occur at the output of the prior art 2 phase charge pump 1 of FIG. 1A. Discharge through controlled current source 4 is controlled as previously explained to achieve regulation of Vout. Discharge through controlled current source 27 is controlled similarly to achieve proper precharging of parasitic capacitors C1p, C2p, and C3p so as to greatly reduce output noise.

Figure 3B:
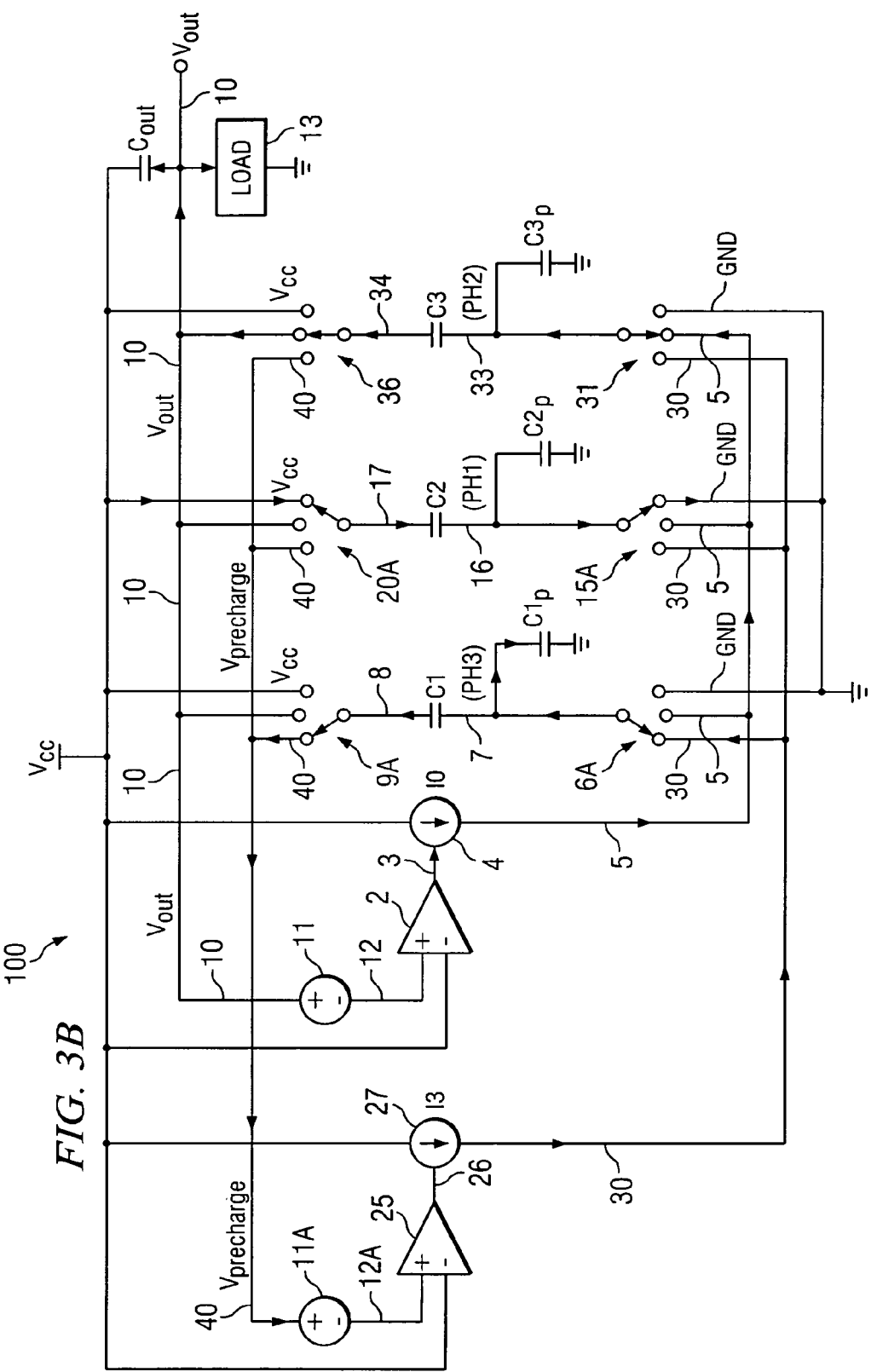
FIG. 3B is a schematic diagram of the charge pump of FIG. 3A with its switches in a second configuration.
Figure 3C:
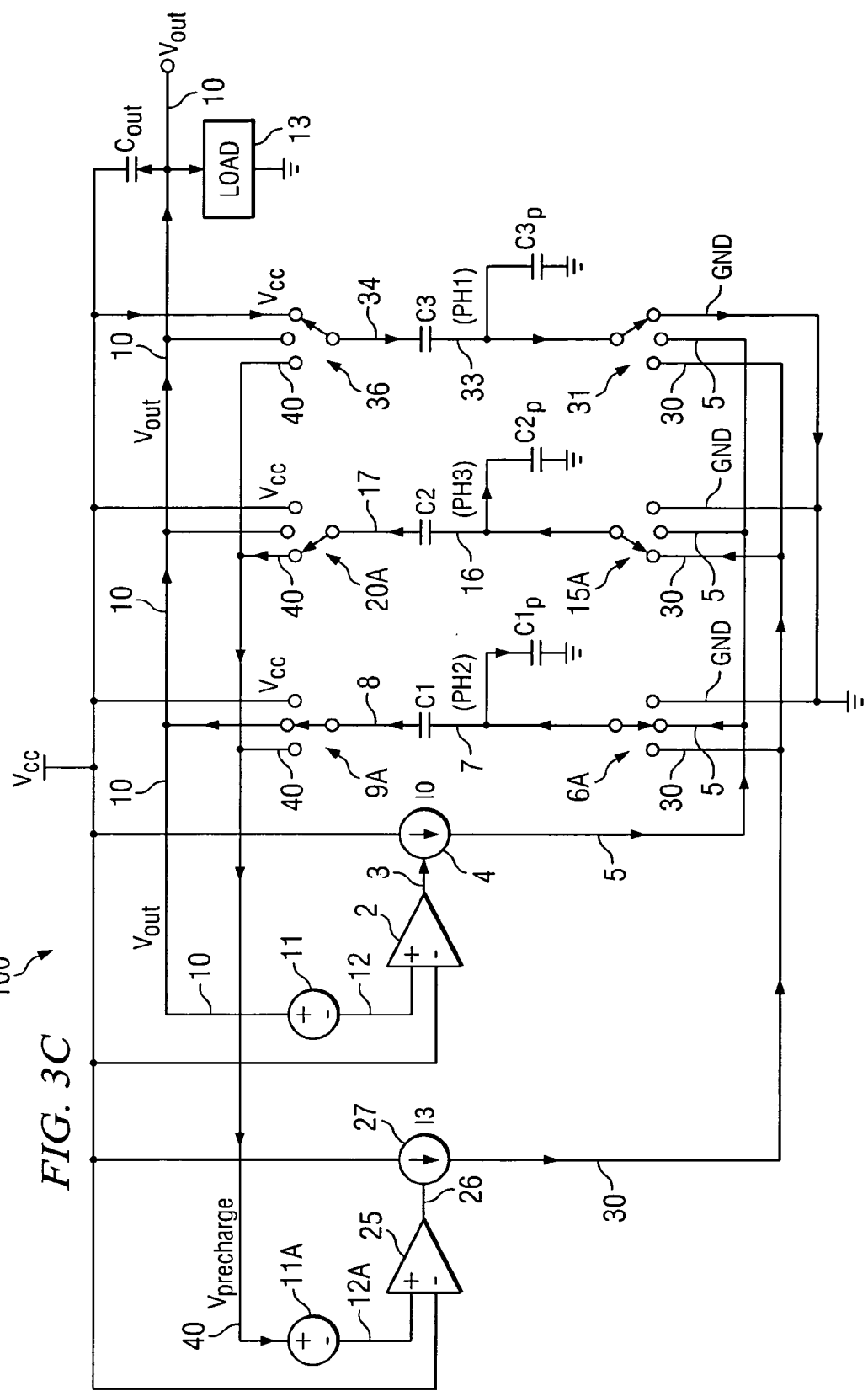
FIG. 3C is a schematic diagram of the charge pump of FIG. 3A with its switches in a third configuration.

A suitable switch control circuit 18A is coupled to control terminals of switches 6A, 9A, 15A, 20A, 31, and 33 to control the operation of the switches in the manner described herein and as illustrated in FIGS. 3A–C and in the waveforms of FIG. 4.

The phase sequence for one full cycle (including Interval 1 followed by Interval 2 followed by Interval 3) for flying capacitor C1 is PH1-PH3-PH2 is illustrated for capacitor C1 in FIGS. 3A–B. Similarly, the phase sequences for the same full cycle for the flying capacitors C2 and C3 are PH2-PH1-PH3 and PH3-PH2-PH1, respectively. These sequences of phases are illustrated for each of flying capacitors C1, C2 and C3 in FIGS. 3A–C, and the waveforms of FIG. 4.

Specifically, for capacitor C1, switches 6A and 9A are connected to ground and VCC, respectively, as shown in FIG. 3A to provide phase PH1, switches 6A and 9A are connected to precharge current source conductor 30 and Vprecharge conductor 40, respectively, as shown in FIG. 3B to provide phase PH3, and switches 6A and 9A are connected to current source conductor 5 and Vout conductor 10, respectively, as shown in FIG. 3C to provide phase PH2. The various arrowheads shown in FIGS. 3A–C illustrate the paths of the current flow for each of the three phases PH1–3.

Similarly, for capacitor C2, switches 15A and 20A are connected to current source conductor 5 and Vout conductor 10, respectively, as shown in FIG. 3A to provide phase PH2, switches 15A and 20A are connected to ground and VCC, respectively, as shown in FIG. 3B to provide phase PH1, and switches 15A and 20A are connected to precharge current source conductor 30 and Vprecharge conductor 40, respectively, as shown in FIG. 3C to provide phase PH3.

Finally, for capacitor C3, switches 31 and 36 are connected to precharge current source conductor 30 and Vprecharge conductor 40, respectively, as shown in FIG. 3A to provide phase PH3, switches 31 and 36 are connected to current source conductor 5 and Vout conductor 10, respectively, as shown in FIG. 3B to provide phase PH2, and switches 31 and 36 are connected to ground and VCC, respectively, as shown in FIG. 3C to provide phase PH1.

In order to greatly reduce the noise generated by prior art charge pump 1 of FIG. 1A associated with the parasitic capacitances C1*p* and C2*p* as a result of the above described charge redistribution between the reservoir capacitor Cout and the above-mentioned parasitic capacitors, the third flying capacitor C3 and third phase PH3 are provided in the process of operating the flying capacitors C1, C2 and C3.

The third phase PH3 is dedicated to equalizing a top plate potential of each flying capacitor before it is actually connected to Vout and reservoir capacitor Cout. According to the present invention, the particular flying capacitor is not connected to Vout immediately after being precharged to VCC volts. Instead, the additional phase PH3 is provided during which the bottom plate parasitic capacitance of that particular flying capacitor is pre-charged such that the top plate of that particular flying capacitor is equal to Vout before being connected directly to Vout, in such a way as to avoid any appreciable charging or discharging of that flying capacitor. Then there is no redistribution of the charge of reservoir capacitor Cout when the upper plate of a flying capacitor is connected to it, because the charge which otherwise would be redistributed onto the parasitic bottom plate capacitance has already been placed on it by the operation of amplifier 25 and current source 27 through conductor 30 and switch 6A, 15A, or 31 without any charging or discharging of the flying capacitor.

The Vout waveform of FIG. 4 illustrates how the precharging process described above avoids the large negative-going noise signals produced by the prior art charge pumps.

The above described precharging of the parasitic capacitors as illustrated in FIGS. 3A–C to eliminate the negative noise spikes of the prior art is accomplished by feedback wherein operational amplifier 27 is the same as operational amplifier 2, charging the bottom plate of C1, C2 or C3, depending on which of the three phases a particular flying capacitor is undergoing, and turns current source 27 off when Vprecharge is equal to Vout.

Figure 6:
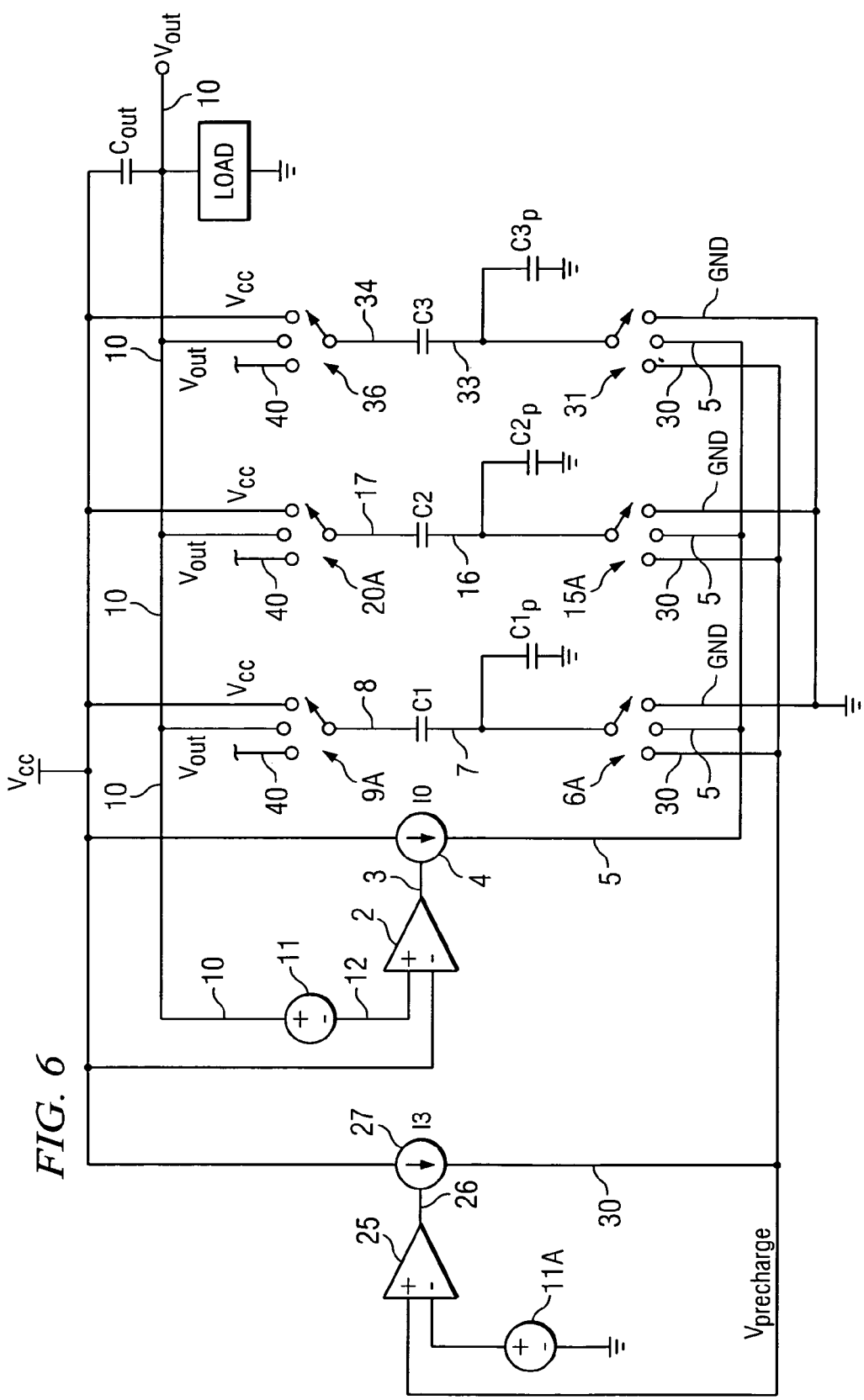
FIG. 6 is a schematic of a charge pump of the present invention with a feed-forward implementation of its precharging circuitry.

A "feed forward" approach to precharging the parasitic capacitances associated with the lower plates of the flying capacitors to cause the voltages of the upper plates of the flying capacitors to be essentially equal to Vout before directly connecting them to Vout is shown in FIG. 6. In FIG. 6, the (+) input of operational amplifier 27 is connected by means of conductor 30 and one of lower switches 6A, 15A or 31 to the bottom plate of one of the flying capacitors C1, C2 or C3 (rather than the top plate thereof as in the feedback implementation of FIG. 3A) to receive a voltage Vprecharge from that bottom plate. Conductor 40 is open-circuited, so that the upper plate of a flying capacitor electrically floats during the precharging phases. Vout is known, since it is established by circuit design parameters, and can be equal, to VCC plus, for example, 1 volt. The precharge circuitry including amplifier 25, voltage source 11A, and controlled current source 27 in FIG. 6 operates to charge up the parasitic capacitance C1*p*, C2*p*, or C3*p* to 1 volt (or other suitable voltage), which causes the top plate of the corresponding flying capacitor to be at precisely VCC+1 volt immediately before the top plate is connected directly to Vout by means of one of the upper switches. The VCC+1 volt value is established by voltage source 11A. For this example, the 1 volt value is the value of voltage source 11A and the VCC value is the voltage across the flying capacitor. Note that this feed forward technique does not require shunting of a minute amount of current from the top plate of the flying capacitor in order for voltage source 11A to function. This can be significant when maximum efficiency (approaching 90–95% efficiency) and minimum current loss in the charge pump is necessary in that every micrompere of shunted current can be accounted for.

The described embodiments of the three-phase charge pump of the present invention provide greatly reduced output noise compared to the two-phase charge pumps of the prior art. The improvement can reduce the output noise of 3-phase charge pump 100 by 1.5 or 2 orders of magnitude, which is quite significant.

Figure 2:
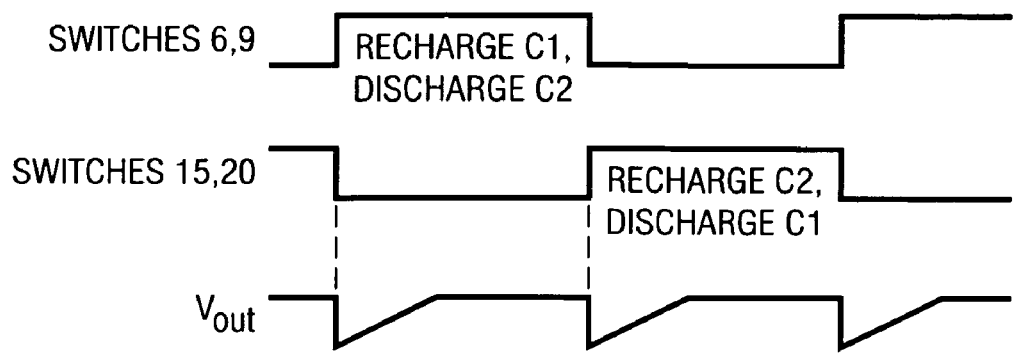
FIG. 2 is a diagram including several waveforms useful in explaining the operation of the prior art charge pump of FIG. 1A.
Figure 5:
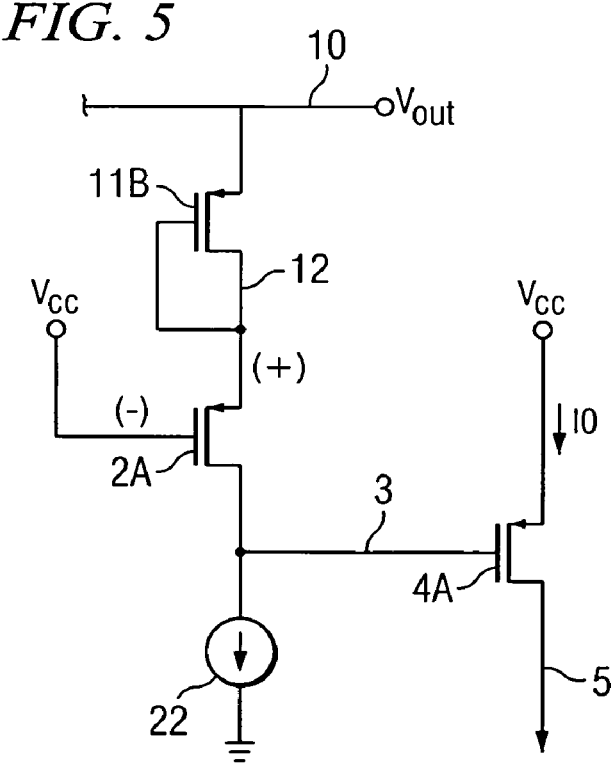
FIG. 5 is a schematic diagram illustrating a simplified implementation of amplifier 2 and controlled current source 4 of FIG. 3A.

FIG. 5 illustrates a very simple implementation of amplifier 2 and controlled current source 4 of FIG. 2A. Amplifier 2 can be implemented by means of a single P-channel 2A, with its source functioning as the (+) input of the amplifier and its gate functioning as the (−) input of the amplifier. The source of transistor 2A is connected by conductor 12 to the gate and a drain of a P-channel diode-connected transistor 11B, which functions as voltage source 11. The source of diode-connected transistor 11B is connected to Vout conductor 10. The drain of transistor 2A is connected to the output 3 of amplifier 2. A current source 22 is connected between the drain of transistor 2A and ground or the negative rail. Ordinarily, the current through current source 22 should be as low as possible because it constitutes an additional load on the charge pump, but the current through current source 22 must be sufficiently large to meet the speed requirements of amplifier 2. (The implementation of amplifier 2 can be simple or somewhat complex, depending on how accurate and/or fast it needs to be.) Controlled current source 4 also can be implemented by means of a single P-channel transistor 4A having its source connected to VCC, its gate connected to conductor 3, and its drain connected to conductor 5.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention.

What is claimed is:

1. A three-phase charge pump circuit for producing a low noise output voltage on an output conductor, the three-phase charge pump comprising:
   (a) a first flying capacitor;
   (b) a first amplifier circuit having an output coupled to control a first current source to produce a first controlled current in a first conductor in response to the output voltage, a first input coupled to a first supply voltage, and a second input coupled to the output conductor;
   (c) a second amplifier circuit having an output coupled to control a second current source to produce a second controlled current in a second conductor in response to a precharge voltage, a first input coupled to the first supply voltage, and a second input coupled to receive the precharge voltage;
   (d) a first switching circuit for selectively coupling a first terminal of the first flying capacitor to the first supply voltage during a first recharging phase and to the output voltage during a first discharging phase;
   (e) a second switching circuit for selectively coupling a second terminal of the first flying capacitor to a second supply voltage during the first recharging phase and to the first conductor during the first discharging phase; and (f) the second switching circuit coupling the second terminal of the first flying capacitor to the second conductor during a first parasitic capacitance precharging phase that occurs between the first recharging phase and the first discharging phase so as to cause the voltage of the first terminal of the first flying capacitor to have a value that avoids noise spikes on the output conductor due to charge redistribution when the first terminal of the first flying capacitor is coupled to the output conductor.

2. The three-phase charge pump circuit of claim 1 including a reservoir capacitor coupled to the output conductor.

3. The three-phase charge pump circuit of claim 1 including
 i. a second flying capacitor;
 ii. a third switching circuit for selectively coupling a first terminal of the second flying capacitor to the output voltage during a second discharging phase;
 iii. a fourth switching circuit for selectively coupling a second terminal of the second flying capacitor to the second supply voltage during the second recharging phase and to the first conductor during the second discharging phase; and
 iv. the fourth switching circuit coupling the second terminal of the second flying capacitor to the second conductor during a second parasitic capacitance precharging phase that occurs between the second recharging phase and the second discharging phase so as to cause the voltage of the first terminal of the second flying capacitor to equal the output voltage.

4. The three-phase charge pump circuit of claim 3 including
 i. a third flying capacitor;
 ii. a fifth switching circuit for selectively coupling a first terminal of the third flying capacitor to the first supply voltage during a third recharging phase and to the output voltage during the third discharging phase;
 iii. a sixth switching circuit for selectively coupling a second terminal of the third flying capacitor to the second supply voltage during the third recharging phase and to the first conductor during the third discharging phase; and
 iv. the sixth switching circuit coupling the second terminal of the third flying capacitor to the second conductor during a third parasitic capacitance precharging phase that occurs between the third recharging phase and the third discharging phase so as to cause the voltage of the first terminal of the third flying capacitor to equal the output voltage.

5. The three-phase charge pump circuit of claim 4 wherein the first recharging phase, the second discharging phase, and the third parasitic capacitance precharging phase occur during a first time interval.

6. The three-phase charge pump circuit of claim 5 wherein the first parasitic capacitance precharging phase, the second recharging phase, and the third discharging phase occur during a second time interval that occurs after the first time interval.

7. The three-phase charge pump circuit of claim 6 wherein the first discharging phase, the second parasitic capacitance precharging phase, and the third precharging phase occur during a third time interval that occurs after the second time interval.

8. The three-phase charge pump circuit of claim 1 wherein the first switching circuit couples the first terminal of the first flying capacitor to a third conductor conducting the precharge voltage during the first parasitic capacitance precharging phase.

9. The three-phase charge pump circuit of claim 1 wherein the first switching circuit couples the first terminal of the first flying capacitor to an electrically floating conductor during the first parasitic capacitance precharging phase.

10. The three-phase charge pump circuit of claim 1 wherein the capacitance associated with the output conductor is substantially less than the capacitance of the first flying capacitor.

11. The three-phase charge pump circuit of claim 2 wherein the capacitance of a reservoir capacitor coupled to the output conductor is substantially greater than the capacitance of the first flying capacitor.

12. The three-phase charge pump circuit of claim 1 wherein the first amplifying circuit includes a voltage source circuit which determines a regulated value of the output voltage.

13. The three-phase charge pump circuit of claim 12 wherein at least one of the first and second amplifier circuits includes a first transistor having a gate which functions as an inverting amplifier input and is coupled to the first supply voltage, a source which functions as a non-inverting amplifier input and is coupled to a gate and drain of a diode-connected second transistor, a source of the second transistor being coupled to the output conductor, the second transistor functioning as the voltage source circuit, a drain of the first transistor being coupled to a current source and functioning as the output of the first amplifier circuit.

14. The three-phase charge pump circuit of claim 13 wherein the first controlled current source includes a third transistor having a source coupled to the first supply voltage, a gate coupled to the drain of the first transistor, and a drain coupled to the first conductor.

15. A method of operating a charge pump circuit to produce a low noise output voltage, comprising:
 (a) selectively coupling a first terminal of a first flying capacitor to a first voltage during a first recharging phase and selectively coupling a second terminal of the first flying capacitor to a second voltage during the first recharging phase;
 (b) coupling the second terminal of the first flying capacitor to a precharge control circuit during a first parasitic capacitance precharging phase that occurs after the first precharging phase to cause the voltage of the first terminal of the first flying capacitor to have a value that avoids noise spikes on the output conductor due to charge redistribution when the first terminal of the first flying capacitor is coupled to the output conductor; and
 (c) coupling the first terminal of the first flying capacitor to an output conductor conducting the output voltage during a first discharging phase that occurs after the first parasitic capacitance precharging phase and coupling the second terminal of the first flying capacitor to a discharge control circuit which increases the voltage of the second terminal of the first flying capacitor during the first discharging phase until the output voltage is equal to a regulated value.

16. The method of claim 15 wherein step (b) includes coupling the first terminal of the first flying capacitor to a precharge voltage during the first parasitic capacitance precharging phase.

17. The method of claim 15 wherein step (b) includes coupling the first terminal of the first flying capacitor to an electrically floating conductor during the first parasitic capacitance precharging phase.

18. The method of claim 15 including, during step (a), coupling a first terminal of a second flying capacitor to the output conductor during a second discharging phase and coupling a second terminal of the second flying capacitor to the discharge control circuit to increase the voltage of the second terminal of the second flying capacitor during the second discharging phase until the output voltage is equal to the regulated value, and coupling a second terminal of a third flying capacitor to the precharge control circuit during a third parasitic capacitance precharging phase to cause the voltage of a first terminal of the third flying capacitor to have a value that avoids noise spikes on the output conductor due to charge redistribution when the first terminal of the third flying capacitor is coupled to the output conductor;

during step (b), selectively coupling the first terminal of the second flying capacitor to the first voltage during a second recharging phase and selectively coupling the second terminal of the second flying capacitor to the second voltage during the second recharging phase, and coupling a first terminal of the third flying capacitor to the output conductor during a third discharging phase and coupling the second terminal of the third flying capacitor to the discharge control circuit to increase the voltage of the first terminal of the third flying capacitor during the third discharging phase until the output voltage is equal to the regulated value; and during step (c), coupling the second terminal of the second flying capacitor to the precharge control circuit during a second parasitic capacitance precharging phase to cause the voltage of the first terminal of the second flying capacitor to have a value that avoids noise spikes on the output conductor due to charge redistribution when the first terminal of the second flying capacitor is coupled to the output conductor, and selectively coupling the first terminal of the third flying capacitor to the first voltage during a third recharging phase and selectively coupling the second terminal of the third flying capacitor to the second voltage during the third recharging phase.

19. A three-phase charge pump circuit for producing a low noise output voltage on an output conductor, comprising:

(a) first means for selectively coupling a first terminal of a first flying capacitor to a first voltage during a first recharging phase and selectively coupling a second terminal of the first flying capacitor to a second voltage during the first recharging phase;

(b) second means for coupling the second terminal of the first flying capacitor to a precharge control circuit during a first parasitic capacitance precharging phase that occurs after the first precharging phase to cause the voltage of the first terminal of the first flying capacitor to have a value that avoids noise spikes on the output conductor due to charge redistribution when the first terminal of the first flying capacitor is coupled to the output conductor; and (c) third means for coupling the first terminal of the first flying capacitor to the output conductor during a first discharging phase that occurs after the first parasitic capacitance precharging phase and coupling the second terminal of the first flying capacitor to a discharge control circuit which increases the voltage of the second terminal of the first flying capacitor during the first discharging phase until the output voltage is equal to a regulated value.

20. The three-phase charge pump circuit of claim 19 including means for performing, during the coupling performed by the first means, the function of coupling a first terminal of a second flying capacitor to the output conductor during a second discharging phase and coupling a second terminal of the second flying capacitor to the discharge control circuit to increase the voltage of the second terminal of the second flying capacitor during the second discharging phase until the output voltage is equal to the regulated value, and coupling a second terminal of a third flying capacitor to a precharge control circuit during a third parasitic capacitance precharging phase to cause the voltage of the first terminal of the third flying capacitor to have a value that avoids noise spikes on the output conductor due to charge redistribution when the first terminal of the third flying capacitor is coupled to the output conductor;

means for performing, during the coupling performed by the second means, the function of selectively coupling a first terminal of the second flying capacitor to the first voltage during a second recharging phase and selectively coupling the second terminal of the second flying capacitor to the second voltage during the second recharging phase, and coupling a first terminal of the third flying capacitor to the output conductor during a third discharging phase and coupling the second terminal of the third flying capacitor to the discharge control circuit to increase the voltage of the first terminal of the third flying capacitor during the third discharging phase until the output voltage is equal to the regulated value; and means for performing, during the coupling performed by the third means, the function of coupling the second terminal of the second flying capacitor to the precharge control circuit during a second parasitic capacitance precharging phase to cause the voltage of the first terminal of the second flying capacitor to have a value that avoids noise spikes on the output conductor due to charge redistribution when the first terminal of the second flying capacitor is coupled to the output conductor, and selectively coupling the first terminal of a third flying capacitor to the first voltage during a third recharging phase and selectively coupling the second terminal of the third flying capacitor to the second voltage during the third recharging phase.

* * * * *